(12) United States Patent
Trebbi

(10) Patent No.: US 9,546,818 B2
(45) Date of Patent: Jan. 17, 2017

(54) DEVICE FOR INTRODUCING BOTTLES INTO A LYOPHILIZATION CHAMBER

(71) Applicant: I.M.A. INDUSTRIA MACCHINE AUTOMATICHE S.P.A., Ozzano Dell'Emilia (IT)

(72) Inventor: Claudio Trebbi, Medicina (IT)

(73) Assignee: I.M.A. INDUSTRIAL MACCHINE AUTOMATICHE S.P.A., Ozzano dell'Emilia (IT)

( * ) Notice: Subject to any disclaimer, the term of this patent is extended or adjusted under 35 U.S.C. 154(b) by 0 days.

(21) Appl. No.: 14/893,474

(22) PCT Filed: May 22, 2014

(86) PCT No.: PCT/IB2014/061632
§ 371 (c)(1),
(2) Date: Nov. 23, 2015

(87) PCT Pub. No.: WO2014/188375
PCT Pub. Date: Nov. 27, 2014

(65) Prior Publication Data
US 2016/0116212 A1    Apr. 28, 2016

(30) Foreign Application Priority Data

May 23, 2013   (IT) .............................. MI2013A0841

(51) Int. Cl.
*B65G 47/32*    (2006.01)
*F26B 5/06*    (2006.01)
(Continued)

(52) U.S. Cl.
CPC ................. *F26B 5/06* (2013.01); *B65G 47/32* (2013.01); *B65G 47/82* (2013.01); *F26B 25/003* (2013.01); *B65G 2201/0244* (2013.01)

(58) Field of Classification Search
CPC ....... B65G 47/06; B65G 47/08; B65G 47/082; B65G 47/32; B65G 47/53; B65G 47/82; B65G 2201/0244; F26B 5/06; F26B 25/003
(Continued)

(56) References Cited

U.S. PATENT DOCUMENTS 5,129,162 A  *  7/1992  Hemmersbach ....... B65G 65/00
                                                     34/217
7,343,696 B2 *  3/2008  Covert ..................... F26B 5/06
                                                     34/92
(Continued)

FOREIGN PATENT DOCUMENTS

DE          203 13 941 U1    12/2004
EP           1 619 459 A1     1/2006
WO      WO-2011/015453 A1     2/2011

OTHER PUBLICATIONS

Search Report and Written Opinion for PCT/IB2014/061632, dated Sep. 15, 2014.

*Primary Examiner* — Mark A Deuble
(74) *Attorney, Agent, or Firm* — Marshall, Gerstein & Borun LLP

(57) ABSTRACT

A device to introduce bottles into a lyophilization chamber of a lyophilization machine provided at least with an arrival plane of the bottles and with a deposit plane inside the lyophilization chamber comprises at least limited feed means cooperating with a thruster bar to move it along an approach travel in the direction from the arrival plane to said deposit plane. The introduction device also comprises pantograph means connected to the limited feed means and to the thruster bar and configured to extend with respect to the limited feed means and toward the deposit plane, at least by (Continued)

the defined amount necessary to introduce the bottles completely into the lyophilization chamber.

6 Claims, 3 Drawing Sheets

(51) Int. Cl.
 *B65G 47/82* (2006.01)
 *F26B 25/00* (2006.01)
(58) Field of Classification Search
 USPC .............................. 198/346.2, 429; 414/806
 See application file for complete search history.

(56) References Cited

U.S. PATENT DOCUMENTS

| | | | | |
|---|---|---|---|---|
| 7,695,230 B2* | 4/2010 | Selch | ................... | B65G 1/0435 34/236 |
| 2012/0159803 A1* | 6/2012 | Van Veen | ................... | F26B 5/06 34/284 |

* cited by examiner

DEVICE FOR INTRODUCING BOTTLES INTO A LYOPHILIZATION CHAMBER

FIELD OF THE INVENTION

The present invention concerns a device configured to at least introduce bottles, vials and various containers into a treatment chamber such as a chamber of a lyophilization and/or sterilization machine, advantageously but not exclusively for the treatment of pharmaceutical products.

The device can also extract the bottles from the treatment chamber.

BACKGROUND OF THE INVENTION

It is known that in the treatment chambers of lyophilization and/or sterilization machines (hereafter lyophilization machines only) there are normally several deposit planes which are mobile from a feed/discharge position to an inactive or holding position. In this way, the deposit planes can be positioned co-planar on each occasion with a plane on which the bottles, vials and various containers (hereafter only bottles) arrive and are arranged, so as to determine a continuity between the deposit plane and the arrival and arrangement plane (hereafter only arrival plane) and allow to feed or discharge the bottles.

To this purpose, the arrival plane cooperates with means to feed bottles and means to discharge bottles.

The arrival plane also cooperates with translation means that thrust the bottles on the deposit plane or remove them once treatment is finished. All this is known.

It is also known that the translation means are of various types and must normally be equipped with movement means.

In the case of translation means which on each occasion, with every row of bottles or groups of rows of bottles, make said row/rows advance as much as is necessary to leave free the space for preparing the next row/rows, and then retreat, the problem arises that the same translation means are able to make the rows of bottles advance only to a certain point. In order that the translation means can make the rows of bottles advance, which bottles will then occupy all or almost all the deposit plane of the lyophilization machine, it is obligatory to provide particular auxiliary thrust means.

The auxiliary thrust means can be pistons, motion feed cables, auxiliary translators, etc.

The thrust means have disadvantages, such as considerable bulk, mechanical complications, electric and electronic complications, maintenance problems, cleaning problems, problems regarding the release of dust, etc.

These disadvantages are all poorly supported in particular environments such as those where pharmaceutical products are treated.

The purpose of the present invention is therefore to simplify known translation means using an introduction device that is simple, easy to make, compact, easy to maintain, which does not emit either dust or particular fumes, and which requires only minimum maintenance and cleaning.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

According to the invention, a device to introduce bottles into a treatment chamber of a lyophilization machine can be used to move one or more rows of bottles from an arrival plane of the bottles to a deposit plane, inside the treatment chamber.

The introduction device substantially consists of two components, the first of which feeds on each occasion one or more rows of bottles as they form on the arrival plane in front of the device.

The first component includes limited feed means, that is, means which feed a thruster bar and take it into contact with the bottles in order to thrust them in the direction of the deposit plane. This feed is limited since it substantially extends only to the bulk of the row/rows of bottles predisposed on each occasion on the arrival plane on each occasion. Then, the limited feed means make the thruster bar retreat to leave the space necessary for the formation of one or more subsequent rows.

The limited feed means continue to carry out the alternate motion described above until the number of rows of bottles to be translated onto the deposit plane of the treatment chamber has been completed.

However, when the complete number of rows has been defined, which creates the desired load to be introduced into the treatment chamber, the load is still at least partly outside the chamber, and must therefore make a further travel in order to reach its destination.

To complete this further travel, the invention provides that between the limited feed means and the thruster bar there are pantograph means that can be activated for this purpose. The pantograph means make up the second component of the introduction device which is the object of this invention.

The limited feed means can be pneumatic pistons or oil pressure pistons or mechanical feed pistons, or other known systems and suitable to the purpose such as thrust or traction cables.

The pantograph cooperates with drive means.

The drive means can be of the most varied type, such as piston means, motor means which drive worm screws, for example opposite right-hand or left-hand screws, offset double rack means, or other known means suitable to create an action to move and position the pantograph.

According to the invention, the thruster bar can have three positions, a thrust one, a non-interference one and an extraction one if the pantograph is such as to make another travel suitable to also cover the depth of the treatment chamber.

There are also position control means and/or management, command and control means.

BRIEF DESCRIPTION OF THE DRAWINGS

These and other characteristics of the present invention will become apparent from the following description of some forms of embodiment, given as a non-restrictive example with reference to the attached drawings wherein.

DETAILED DESCRIPTION OF SOME FORMS OF EMBODIMENT

Figure 1:
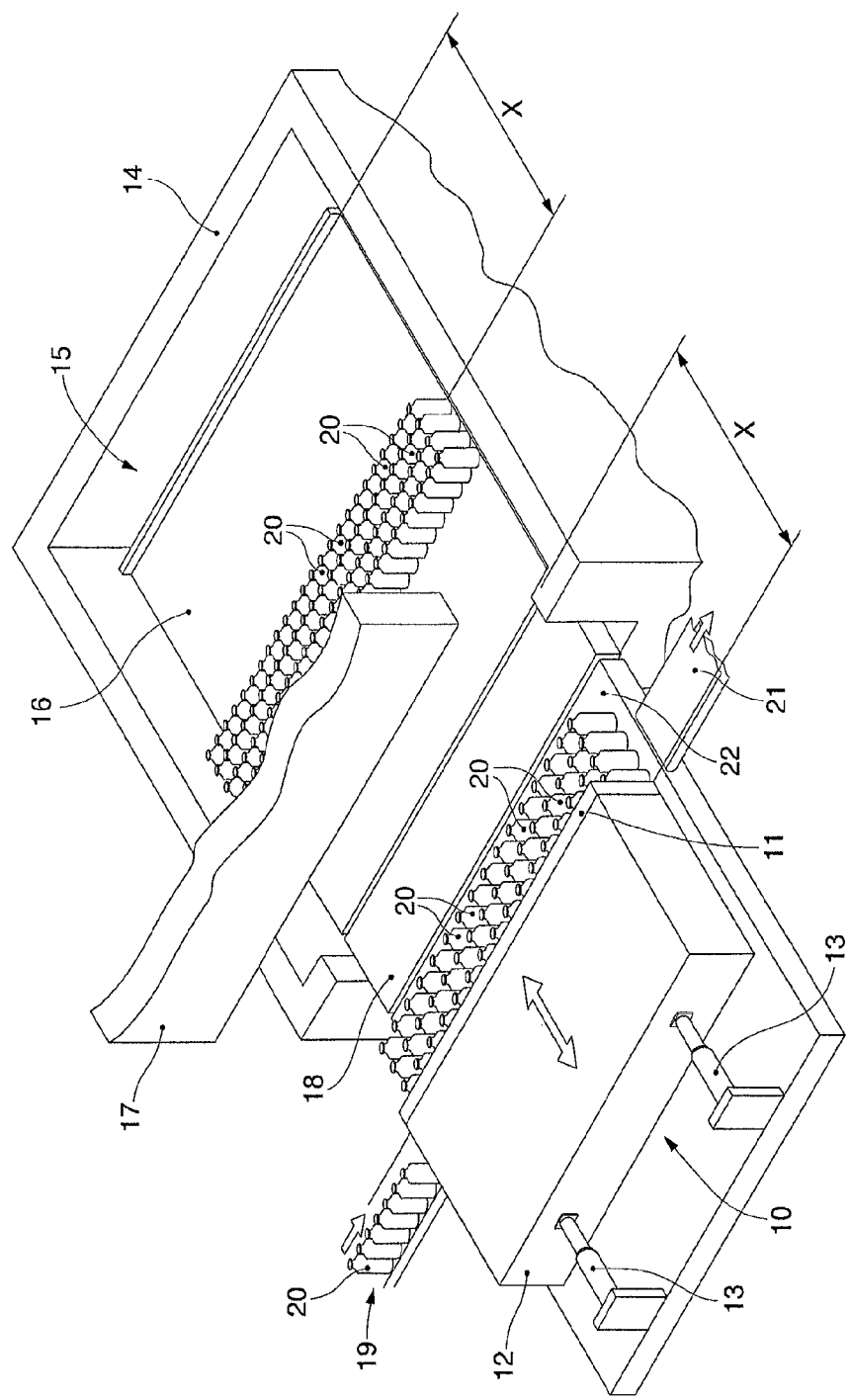
FIG. 1 shows generically, in a three dimensional view, a device to introduce bottles according to the present invention.

We shall now refer in detail to the various forms of embodiment of the present invention, of which one or more examples are shown in the attached drawings. Each example is supplied by way of illustration of the invention and shall not be understood as a limitation thereof. For example, the characteristics shown or described insomuch as they are part of one form of embodiment can be adopted on, or in association with, other forms of embodiment to produce another form of embodiment. It is understood that the present invention shall include all such modifications and variants.

The attached drawings are used to describe forms of embodiment of an introduction device 10 associated to a lyophilization machine 14 provided with a treatment chamber, or lyophilization chamber 15.

The lyophilization machine 14 includes a deposit plane 16, or a plurality of deposit planes 16, on which bottles 20 to be subjected to lyophilization treatment are deposited.

In the case of a plurality of deposit planes 16, these are stacked in a known way inside the lyophilization chamber 15 and can be positioned on each occasion in the known way.

The bottles 20 are fed to the deposit plane 16 located in a feed/discharge position. Similarly, the bottles 20 are discharged from the deposit plane 16 which on each occasion is in the feed/discharge position.

In the attached drawings, merely by way of non-restrictive example, a single deposit plane 16 is shown, located in the feed/discharge position.

The lyophilization machine 14 also includes a sealing door 17 configured to close and seal the lyophilization chamber 15 during the treatment steps of the bottles 20.

In the case shown, the deposit plane 16 cooperates with an intermediate temporary connection plane 18 which, according to requirements, is positioned or discharged.

Other forms of connection are known.

The intermediate plane 18, during the loading or unloading of the bottles 20, is positioned between the deposit plane 16 and the arrival plane 22.

The bottles 20 arrive on the arrival plane 22 and, in the known way, are disposed in rows which are then translated toward the deposit plane 16.

Generally, the arrival plane 22 cooperates with feed means 19 and with discharge means 21, which respectively take one or more rows of bottles 20 to the arrival plane 22 before the treatment and pick them up from it after the treatment.

What has been described heretofore is all known and can be realized in any of the formulations already known in the state of the art.

A thruster bar 11, which operates in a known way as indicated before, that is, moving with an alternate motion, cooperates with the feed means 19, feeding the bottles 20 by thrusting them in the direction of the deposit plane 16 and retreating to leave the space necessary for the formation of one or more rows of bottles 20 on the arrival plane 22.

With reference to the attached drawings, the thruster bar 11 in this case is part of a mobile container 12 associated to thrust means, defined by pistons 13, which determine the alternate motion thereof.

On the basis of the above description, the mobile container 12 and the pistons 13 define limited feed means, configured to make the thruster bar 11 carry out a limited travel and make it advance by a quantity equal to the bulk of the rows of bottles 20 present on the arrival plane 22.

Moreover, the mobile container 12, the thruster bar 11 and the pistons 13 constitute the introduction device 10.

Figure 2:
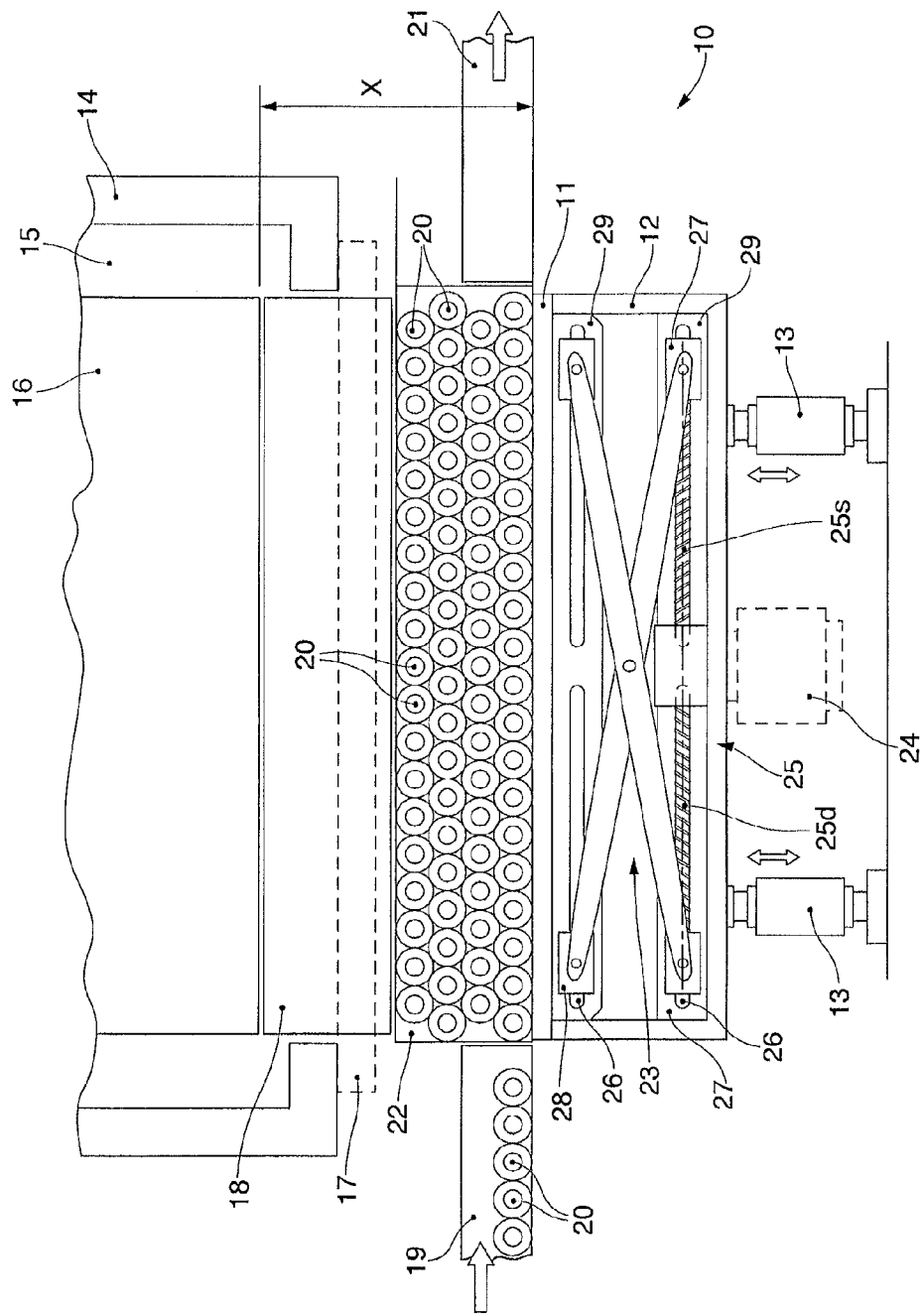
FIG. 2 shows, in a plan view, one form of embodiment of the introduction device in FIG. 1.

FIG. 2 is used to describe forms of embodiment of the introduction device 10 in which the mobile container 12 contains a pantograph 23 to which the thruster bar 11 is terminally connected.

The mobile container 12 can have various shapes, since it only carries out the sole function of containing the pantograph 23 at least in a retracted condition of the latter.

On the basis of the travel which the thruster bar 11 has to make, some forms of embodiment can provide that the introduction device 10 includes several pantographs 23 in series.

The pantograph 23 can be the known type and in this case the ends can cooperate with free sliders 28 and with motorized sliders 27.

The motorized sliders 27 in this case cooperate with respective guides 26 made in corresponding guide bearers 29.

The motorized sliders 27 can be moved linearly by motion transmission members, which in this case are for example opposite worm screws 25, but in other forms of embodiment (not shown in the drawings) can be, for example, piston-type linear actuators or racks lying on offset planes.

The thrust that drives the pantograph 23 can also be coaxial with the movement of the thruster bar 11.

In FIG. 2 two opposite worm screws 25 are shown which are merely by way of example a right-hand 25*d* and a left-hand 25*s* screw.

In some forms of embodiment, the guide bearers 29 of the guides 26 of the motorized sliders 27 can be attached to the mobile container 12.

Both the worm screws 25, in the case shown by way of example in FIG. 2, can be driven by a motor member 24 connected to both.

According to some implementations, the motor member 24 can be partly external, as shown in FIG. 2, with respect to the mobile container 12, or can be coaxial with the worm screws 25.

When the pistons 13 reach their maximum extension, and therefore have finished their thruster function, the thruster bar 11, and thus the last bottles 20 loaded onto the arrival plane 22, is positioned at a distance X from the deposit plane 16.

Then the pantograph 23 is driven, which is configured to cover the distance X making the thruster bar 11 do another travel, or loading travel, in order to thrust the bottles 20 inside the lyophilization chamber 15 and feed the deposit plane 16.

Figure 3:
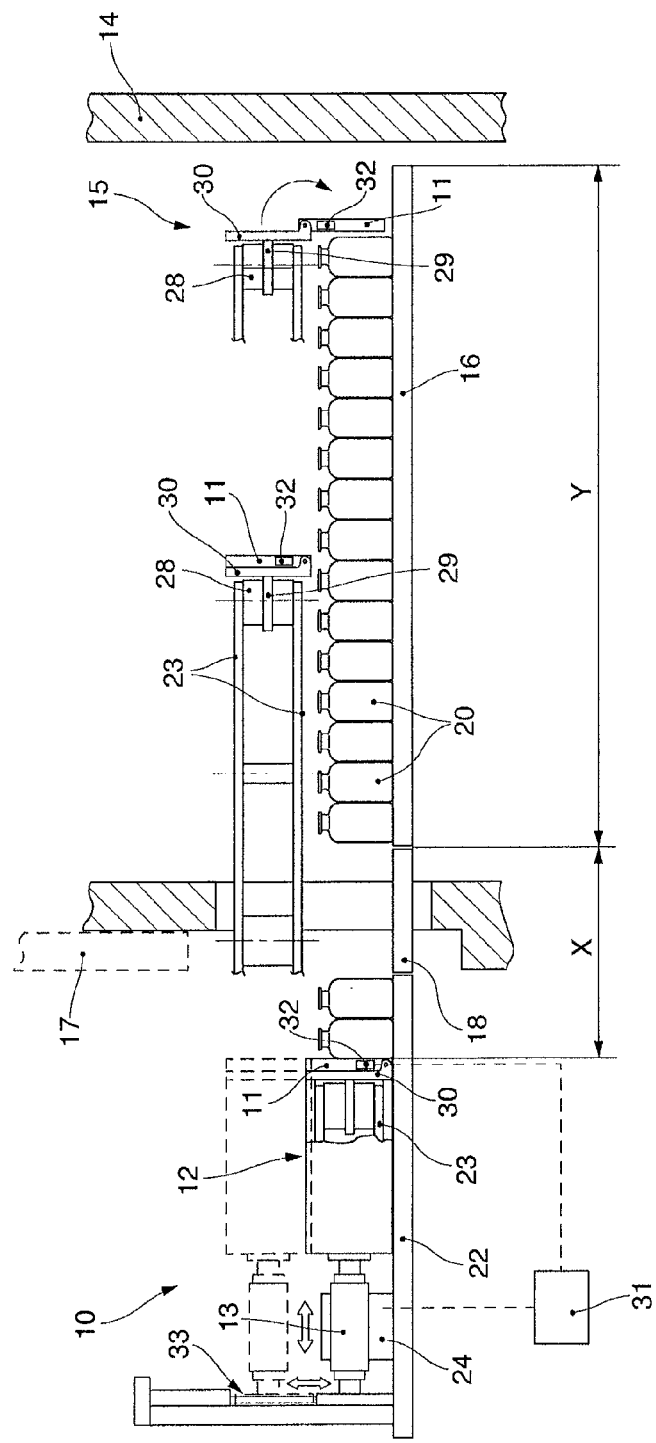
FIG. 3 schematically shows, in a lateral view, the functioning of one form of embodiment of the introduction device in FIG. 1.

FIG. 3 shows an embodiment in which the pantograph 23, or the mobile container 12, which can for example be positioned vertically on two positions by means of lifting means 33, or another suitable mean, is configured to make the thruster bar 11 assume three different operating positions: a first thrust position, a second position of non-interference and a third extraction position.

In the first thrust position, on the left in FIG. 3, the pantograph 23 is in the retracted condition, inside the mobile container 12, and the thruster bar 11 is positioned in contact with the bottles 20.

In the second position of non-interference, at the center in FIG. 3, the thruster bar 11 is located above the vertical bulk of the bottles 20 and is movable by the pantograph 23 in extension without coming into contact with them.

In this case the pantograph 23, as well as the loading travel as described above, can also be able to do another travel, to cover the whole depth Y of the deposit plane 16, in order to take the thruster bar 11 as far as the rear part of the deposit plane 16, beyond the row of bottles 20 positioned innermost in the lyophilization chamber 15, in the third extraction position.

In the third extraction position, on the right in FIG. 3, the pantograph 23 is essentially in a condition of maximum extension and the thruster bar 11 assumes the function of extraction bar, in which at least one of its parts can operate in contact with the innermost bottles 20 in order to extract said bottles 20. Indeed, when the pantograph 23 is driven to return into the retracted condition, the bar 11 draws the bottles 20 toward the arrival plane 22, discharging them from the deposit plane 16.

In its passage from the position of non-interference to the extraction position, the thruster bar 11 can be moved, all or only part of it, in order to cooperate vertically with the bottles 20.

FIG. 3 shows by way of example a possible implementation in which the thruster bar 11 is connected to the pantograph 23 by means of connection brackets 30, of which only one is visible in the drawing. In this example solution, the thruster bar 11 has a lower end pivoted to the connection brackets 30.

In the thrust and non-interference position, the thruster bar 11 is closed on the connection brackets 30, while in the extraction position it is rotated by about 180° around the pivoting point with respect to the previous positions and is disposed below the pantograph 23.

In other solutions it can be provided that the thruster bar 11 is able to slide vertically with respect to the connection brackets 30 from a position substantially coincident with their vertical bulk to a position protruding from the lower part.

This position is maintained during the return movement of the pantograph 23 from the position of maximum extension to the retracted position, so that the contact between the thruster bar 11 and the bottles 20 allows to return these from the deposit plane 16 to the arrival plane 22.

It is clear that modifications and/or additions of parts may be made to the device 10 to introduce bottles as described heretofore, without departing from the field and scope of the present invention.

For example, the introduction device 10 can also include a command and control unit 31 connected to the motor member 24 and with at least a position detector 32, for example a linear transducer or encoder, which detects the position of the thruster bar 11. The command and control unit 31 can be configured to drive the motor member 24 and manage the advance of the pantograph 23 on the basis of the position assumed by the thruster bar 11 and detected by the position detector 32, for example in order to control the selective passage of the thruster bar 11 from the thrust position to the non-interference position and to the extraction position.

It is also clear that, although the present invention has been described with reference to some specific examples, a person of skill in the art shall certainly be able to achieve many other equivalent forms of device to introduce bottles, having the characteristics as set forth in the claims and hence all coming within the field of protection defined thereby.

The invention claimed is:

1. An introduction device to introduce bottles into a lyophilization chamber of a lyophilization machine provided at least with an arrival plane of the bottles and with a deposit plane inside said lyophilization chamber, said introduction device comprising at least limited feed means cooperating with a thruster bar to move said thruster bar along an approach travel in the direction from said arrival plane to said deposit plane, further comprising pantograph means connected to said limited feed means and to said thruster bar and configured to extend with respect to said limited feed means and toward said deposit plane, at least by a defined amount necessary to introduce the bottles completely into the lyophilization chamber and wherein said limited feed means comprise thrust means with an associated container mobile along said approach travel, said thruster bar being part of said mobile container.

2. The introduction device as in claim 1, wherein said container contains said pantograph means.

3. The introduction device as in claim 2, further including at least a motor member conditioning a temporal position of said pantograph means.

4. The introduction device as in claim 3, wherein the motor member is associated to motion transmission members which comprise worm screws.

5. The introduction device as in claim 1, wherein the device is further configured to make said thruster bar assume at least a first position to thrust said bottles, a second position of non-interference with said bottles, and a third position to extract said bottles.

6. The introduction device as in claim 1, wherein the device is further configured to make said thruster bar assume at least a first position to thrust said bottles, a second position of non-interference with said bottles, and a third position to extract said bottles, and wherein said pantograph means are configured to extend the position of the thruster bar as far as beyond the innermost row of bottles present on said deposit plane.

* * * * *